Figure 1:
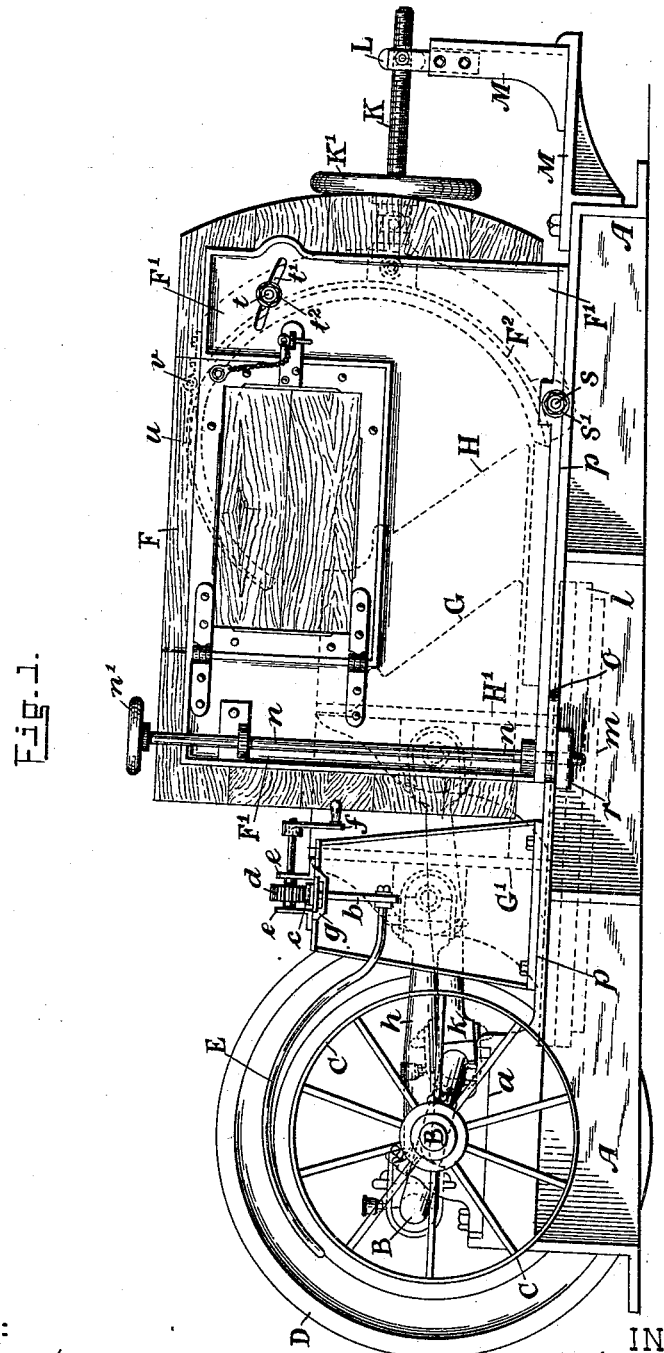

(No Model.)　　　J. H. & I. MITCHELL.　　2 Sheets—Sheet 1.
FULLING STOCK.

No. 479,605.　　　　　　　　Patented July 26, 1892.

WITNESSES:
Arthur B Crossley
Thomas H Barron

INVENTORS:
John H. Mitchell
Isaac Mitchell
by Herbert W. Jenner
atty.

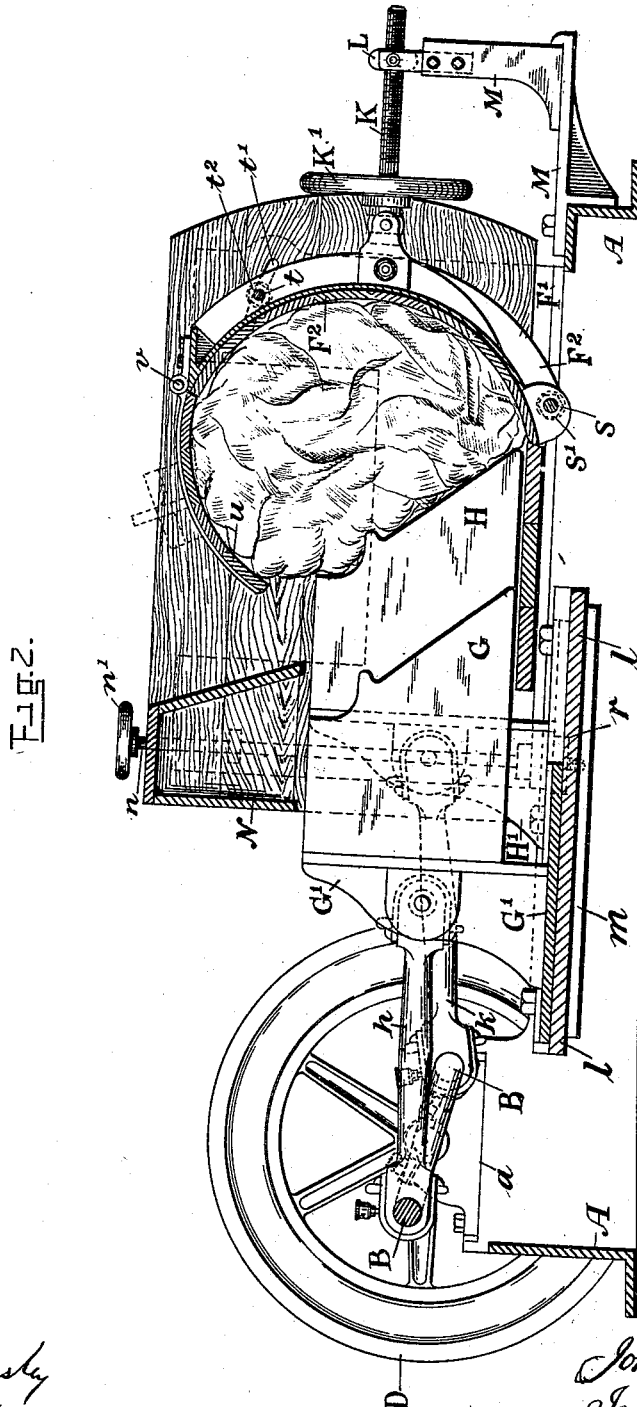

UNITED STATES PATENT OFFICE.

JOHN H. MITCHELL AND ISAAC MITCHELL, OF BROCKHOLES, NEAR HUDDERSFIELD, ENGLAND.

FULLING-STOCK.

SPECIFICATION forming part of Letters Patent No. 479,605, dated July 26, 1892.

Application filed March 21, 1892. Serial No. 425,770. (No model.)

*To all whom it may concern:*

Be it known that we, JOHN HIRST MITCHELL and ISAAC MITCHELL, citizens of Great Britain, residing at Brockholes, near Huddersfield, in the county of York, England, have invented certain new and useful Improvements in Fulling-Stocks; and we do hereby declare the following to be a full, clear, and exact description of the invention, such as will enable others skilled in the art to which it appertains to make and use the same.

Our invention has reference to "stocks" employed in milling or fulling woolen fabrics and other materials.

In constructing a machine for the above purposes according to our invention we employ a pair of feet caused to reciprocate backward and forward, horizontally by means of a double crank or other equivalent device. These reciprocating feet work within a trough or box, in which the fabric is placed to be operated upon, and in order to lessen or increase the area of the trough we cause the said trough to be made adjustable, so as to increase or diminish the space between the reciprocating feet and the end of the trough, the adjustment being effected by means of a screw. The outward end of the trough, however, is adjustable independently of the trough itself, and this is effected by means of the lower end of the trough being hinged or capable of working upon a pivot, the upper end being adjustable within a slot, and in order to keep the fabric within given limits we employ at the top of the trough a hinged lid of semicircular or other shape, which is made to bear upon the fabric and which will rise and fall according to the size and position of the fabric operated upon. For the purpose of forcing the hinged lid upon the fabric we employ at the top of the said lid removable weights, so that the pressure of the hinged lid upon the fabric may be adjusted.

In order that our invention may be more fully understood, reference is herein had to the accompanying drawings, illustrative thereof, in which—

Figure 1 is a side elevation of a milling and fulling stock constructed according to our invention, and Fig. 2 is a sectional elevation of same.

Referring to the drawings, A represents the frame or bed-plate of the machine; B, the double crank-shaft, mounted in pedestals $a$ $a$, such said shaft carrying fast and loose pulleys C and a fly or balance wheel D. A belt-shifter is shown at E, carried by bracket $b$, having a rack $c$ thereon, into which gears a pinion $d$, mounted in fixed supports $e$ and operated by handle $f$. The rotation of pinion $d$ causes the bracket $b$ to slide endwise in a suitable path in the frame $g$, and thus transfer the belt from the fast to the loose pulley, or reversely.

The top of the frame or bed-plate A is planed or suitably faced to support the fulling or milling trough or box F, which is adapted to slide endwise thereon, as hereinafter explained.

G and H represent the feet, which are reciprocated backward and forward in the trough or box F by the double crank B through the medium of connecting-rods $h$ and $k$, secured at one end to the cranked portions of shaft B and at the opposite ends to brackets or pedestals G' and H', to which the feet are secured and by which they are supported clear of the floor of the trough, the said brackets being adapted to slide in a guide-plate $l$, which is bolted to ribs or wings $m$, projecting from the sides of the frame A. The trough or box F is provided with vertical bolts $n$, (one at each side of the machine,) which pass through slots or openings $o$, formed in the rail $p$ of the frame A, nuts $r$ being used at the bottom to secure the trough against endwise movement after being adjusted and when the machine is at work, or other equivalent means for securing the trough to the frame may be employed. The said bolts $n$ are operated by small hand-wheels $n'$, the turning of the bolts in one direction tightening the nuts $r$ against the under side of the rail $p$ and securing the trough or box to the frame A, while turning the hand-wheels in the other direction slackens the nuts and permits of the trough or box being moved endwise on the frame to extents limited by the slots $o$.

The trough or box F is lined with wood secured to metal side frames F' and to an end frame F², which latter is preferably curved, as shown, so that the end of the box or trough forms a segment of a circle; but the box or trough may, if required, be made to any other configuration or shape.

The end frame F², with its wood lining, is pivoted on the rod $s$, passing through the webs or ribs of the frame and through the sides of the trough, to which said rod is secured by nuts $s'$. The upper end of the frame F² carries a horizontal rod $t$, which passes through slots $t'$, formed in the sides of the said trough or box circumferential to the center of the rod $s$, the end of the said rod being provided with screw-threads adapted to receive nuts $t^2$, by which the frame F² is secured in any position within the limits of slots $t'$. Attached to the central rib of the frame F² is a screw K, capable of working in and through a nut L, attached to and supported by brackets M, bolted to the frame or bed-plate A. The said screw carries a hand-wheel K', by which it is rotated and caused to work through the nut L for the purpose of drawing the trough or box F bodily (or only the pivoted end frame F²) toward that end of the machine or forcing them in the opposite direction in order to enlarge or increase the space between the feet G and H and the curved end of the trough or box or to reduce such space, according as the materials or articles operated upon are large and require more space or only small and need less space in order to be properly milled or fulled.

The trough or box and pivoted frame F² are moved separately and independently of each other, the former being held secure by the nuts $r$ and the latter by nuts $t^2$. If the trough requires moving bodily, the nuts $r$ are slackened and the screw K operated in the direction and to the extent required, whereupon the nuts $r$ are again tightened to secure the trough to the frame A. The frame F² may then be moved on its pivot, if required, the nuts $t^2$ being slackened to allow this to be done, and when adjusted the nuts $t^2$ are screwed up tight again. In order to keep the fabric within given limits, a semicircular or other suitably-shaped lid $u$, hinged at $v$ to the end frame F², is employed, which bears upon the fabric and rises and falls, according to the size and position of the fabric being operated upon. This lid may be weighted, as shown in dotted lines in Fig. 2, the weights being removable, so that the pressure of the lid upon the fabric may be adjusted.

N is a cover or inverted box, which prevents the fabric being thrown over the reciprocating feet G and H and becoming entangled and damaged thereby.

The base of the frame or bed-plate A is inclined, so that the several parts of the machine lean to one end, as shown.

By the construction of a machine for fulling or milling woven, knitted, felted, or other fabrics or materials as hereinbefore described a larger range and variety of materials can be operated upon by the same machine than is the case with those at present in use, the means of adjustment of the parts being simple and easily effected, while the action of the machine is well adapted for the milling and fulling, which is accomplished in less time than at present.

What we claim is—

1. In a fulling-machine, the combination, with the bed, the crank-shaft carried by the bed, and the feet reciprocated by the said crank-shaft, of the box adjustable longitudinally on the bed and provided with a clamping device, the curved end frame pivoted in the said box and provided with a clamping-bolt, and a screw connected with the bed and with the end frame and adapted to be revolved to adjust the position of the said box and also the position of the said end frame with respect to the said feet, substantially as set forth.

2. In a fulling-machine, the combination, with the bed and the box longitudinally adjustable on the bed, of the curved end frame pivoted in the box and provided with a clamping device, a bracket secured to the bed behind the end frame, a nut pivoted in the said bracket, and a revoluble adjusting-screw pivoted to the said end frame and engaging with the said nut, substantially as set forth.

3. In a fulling-machine, the combination, with the reciprocating feet, of the box, the curved end plate pivoted in the lower part of the box and provided with a clamping-bolt, the curved lid hinged to the upper part of the said end plate and extending part way over the said feet, and the cover supported over the said feet and adapted to prevent the material from lodging on top of them, substantially as described and shown.

In testimony whereof we affix our signatures in presence of two witnesses.

JOHN H. MITCHELL.
ISAAC MITCHELL.

Witnesses:
ARTHUR BENJAMIN CROSSLEY,
THOMAS H. BARRON,
*Both of Market Place, Huddersfield.*